(12) United States Patent
Zhang et al.

(10) Patent No.: US 7,624,512 B2
(45) Date of Patent: Dec. 1, 2009

(54) TEST APPARATUS FOR GAUGING RADII OF COLUMNIFORM WORKPIECES

(75) Inventors: Bing-Jun Zhang, Shenzhen (CN); Lian-Zhong Gong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 39 days.

(21) Appl. No.: 12/102,014

(22) Filed: Apr. 14, 2008

(65) Prior Publication Data

US 2009/0031573 A1  Feb. 5, 2009

(30) Foreign Application Priority Data

Aug. 1, 2007  (CN) .......................... 2007 1 0201246

(51) Int. Cl.
*G01B 5/18* (2006.01)
*G01B 5/08* (2006.01)

(52) U.S. Cl. ........................... 33/555.1; 33/553; 33/833

(58) Field of Classification Search .............. 33/501.02, 33/551, 553, 555.1, 710, 832, 833
See application file for complete search history.

(56) References Cited

U.S. PATENT DOCUMENTS

| 3,631,603 | A | * | 1/1972 | Munro et al. ................. 33/553 |
| 3,848,339 | A | * | 11/1974 | Strasbaugh ................... 33/832 |
| 6,067,720 | A | * | 5/2000 | Heilbronner et al. .......... 33/553 |
| 6,092,411 | A | * | 7/2000 | Tokoi .......................... 73/1.79 |
| 6,415,526 | B1 | * | 7/2002 | Buckner et al. ............... 33/833 |
| 6,971,182 | B1 | * | 12/2005 | Guffey et al. ................. 33/833 |
| 7,137,210 | B2 | * | 11/2006 | Kanai et al. ................. 33/555.1 |
| 2002/0170196 | A1 | * | 11/2002 | Takemura et al. ............. 33/551 |
| 2008/0148590 | A1 | * | 6/2008 | Hayashi et al. ............... 33/710 |
| 2009/0094851 | A1 | * | 4/2009 | Xiao et al. .................... 33/832 |

* cited by examiner

*Primary Examiner*—G. Bradley Bennett
(74) *Attorney, Agent, or Firm*—Frank R. Niranjan

(57) ABSTRACT

An exemplary test apparatus for a columniform workpiece includes a base plate, a support plate perpendicularly mounted to a top surface of the base plate, a shaft rotatably mounted to the support plate, a contact member mounted the support plate and perpendicularly slidable relative to the support plate, and a test meter. The shaft is configured for mounting the columniform workpiece at a side of the support plate and making the columniform workpiece perpendicularly rotate relative to the support plate. The contact member includes a first end contacting the end surface of the columniform workpiece. The test meter includes a pole with a distal end contacting a second end opposite to the first end of the contact member, the poles' length resiliently adjusting corresponding to the end surface of the columniform workpiece, and a value of the test meter changing corresponding to changes in the length of the pole.

11 Claims, 5 Drawing Sheets

TEST APPARATUS FOR GAUGING RADII OF COLUMNIFORM WORKPIECES

BACKGROUND

1. Field of the Invention

The present invention relates to a test apparatus for gauging radii of columniform workpieces.

2. Description of Related Art

Heat sinks are generally used for dissipating heat of electronic components. Heat sinks are easily deformed during punching or other processes, and if that occurs, their heat dissipation ability is diminished. For the heat sink, it is necessary to test planeness of its end surface.

Typically, a plug gauge is used for testing the planes of an end surface of the heat sink. The heat sink is generally placed on a flat support, with the end surface thereof contacting the flat support, thus a plurality of clearances is formed between different parts of the end surface of the heat sink and the flat support. Attempts are made to insert the plug gauge into each clearance. The end surface of the heat sink is eligible if the plug gauge cannot fit into any of the clearances. However, using the plug gauge to test each clearance is time-consuming.

SUMMARY

An exemplary test apparatus for a columniform workpiece includes a base plate, a support plate perpendicularly mounted to a top surface of the base plate, a shaft rotatably mounted to the support plate, a contact member mounted the support plate and perpendicularly slidable relative to the support plate, and a test meter. The shaft is configured for mounting the columniform workpiece at a side of the support plate and making the columniform workpiece perpendicularly rotate relative to the support plate. The contact member includes a first end thereof contacting the end surface of the columniform workpiece. The test meter includes a pole with a distal end thereof contacting a second end opposite to the first end of the contact member, the poles' length resiliently adjusting corresponding to the end surface of the columniform workpiece, and a value of the test meter changing corresponding to changes in the length of the pole.

Other advantages and novel features of the present invention will become more apparent from the following detailed description of preferred embodiment when taken in conjunction with the accompanying drawings, in which:

DETAILED DESCRIPTION

Figure 1:
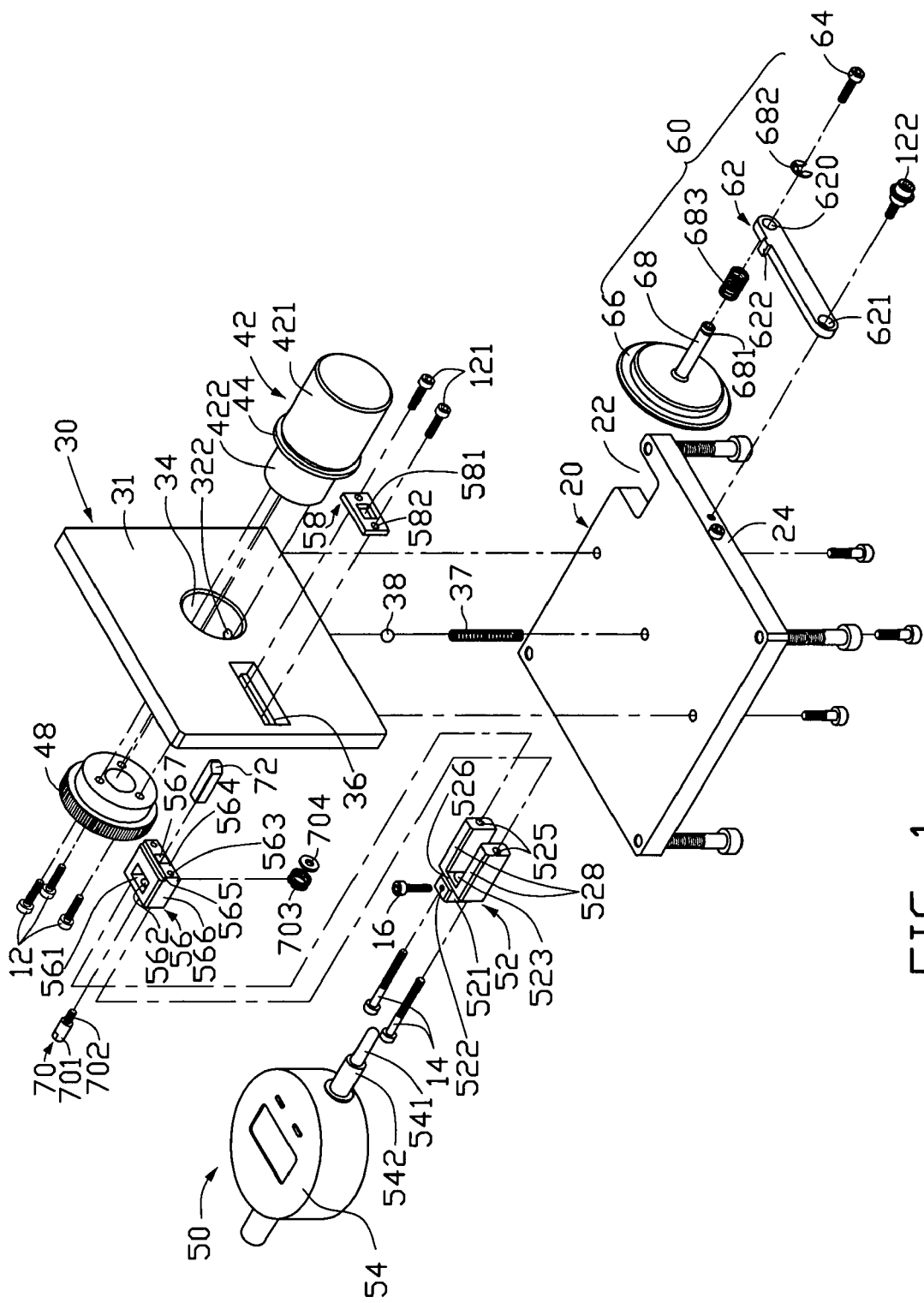
FIG. 1 is an exploded, isometric view of a test apparatus in accordance with an embodiment of the present invention.

Referring to FIG. 1, a test apparatus in accordance with an embodiment of the present invention includes a base plate 20 with a cutout 22 defined in a side thereof near a corner, a support plate 30 perpendicularly mounted to a top surface of the base plate 20, a fastening system 60 rotatably mounted to a side 24 neighboring the cutout 22 of the base plate 20, a shaft 40 (labeled in FIG. 2), and a test system 50 fixed to the support plate 30. The base plate 20 defines a plurality of through holes therein.

The support plate 30 includes a first side surface 31 facing the fastening system 60, and a second side surface 32 (shown in FIG. 2) opposite to the first side surface 31. The first side surface 31 is plane. A block 321 (shown in FIG. 2) extends from the second side surface 32. A round through hole 34 is defined in the support plate 30 extending from the first side surface 31 to the block 321. The support plate 30 defines a stepped slot 36 adjacent the through hole 34. A plurality of fixing holes perpendicular to the through hole 34 is defined in a bottom of the support plate 30, corresponding to the through holes of the base plate 20. A fixing hole 322 of the fixing holes is communicated with the through hole 34.

The shaft 40 includes a main body 42 and a rotatable part 48 mounted to the main body 42. The main body 42 includes a positioning portion 421, a mounting portion 422 defining a locating slot 46 in a bottom thereof (shown in FIG. 3), and a shoulder 44 protruding from a circumference thereof between the positioning portion 421 and the mounting portion 422. A slot 43 (labeled in FIG. 3) is defined in the circumference of the positioning portion 421 adjacent the shoulder 44.

The test system 50 includes a frame 52, a test meter 54 fixed to the frame 52, a support member 56, and a mounting plate 58. The frame 52 is generally U-shaped and includes a vertical plate 526, and two side plates 528 perpendicularly extending from opposite sides of the vertical plate 526. A holding member 521 is mounted to a lateral surface opposite to the side plates 528, of the vertical plate 526. A through hole 523 is defined in the holding member 526 and extends through the vertical plate 526 and the holding member 521. Each side plate 528 defines a through hole 525 extending from a distal end thereof through the vertical plate 526. A screw hole 522 is defined in the holding member 526 perpendicular to and communicating with the through hole 523. The test meter 54 includes a pole 541 extending therefrom and an annular portion 542 ringing the pole 541.

The support member 56 is generally rectangular shaped and defines a rectangular through hole 561 through top surface and bottom surfaces thereof. A round hole 562 perpendicular to and communicating with the rectangular through hole is defined in a center of a first side surface of the support member 56. Two screw holes 563 are defined in the support member 56 extending through the first side surface and a second side surface 564 opposite to the first side surface. A depressed portion 565 is defined in a junction of the top surface and the second side surface 564. A rectangular hole 567 perpendicular to and communicating with the through hole 561 is defined in the second side surface 564. The mounting plate 58 defines a rectangular hole 581 in a center thereof corresponding to the rectangular hole 567 of the support member 56, and two through holes 582 in opposite sides thereof corresponding to the screw holes 563 of the support member 56. A contact member includes a peg 70 and a test block 72 that are mounted to the support member 56. The peg 70 includes a column portion 701 and a screw portion 702. The test block 72 defines a screw hole in an end thereof.

The fastening system 60 includes an swing arm 62, a round plate 66, and a column 68 extending from a central portion of the round plate 66. The swing arm 62 defines two holes 620, 621 in opposite ends thereof. A protruding portion 622 extends up from the swing arm 62 for preventing the swing arm 62 being lower than the base plate 20. The round plate 66 defines a concavity 61 (shown in FIG. 2) in a side surface thereof. The column 68 extends from an opposite side surface
} of the round plate 66. An annular slot 681 is defined in a circumference of a distal end of the column 68. A fixing hole is defined in the distal end of the column 68 along an axial direction.

Figure 2:
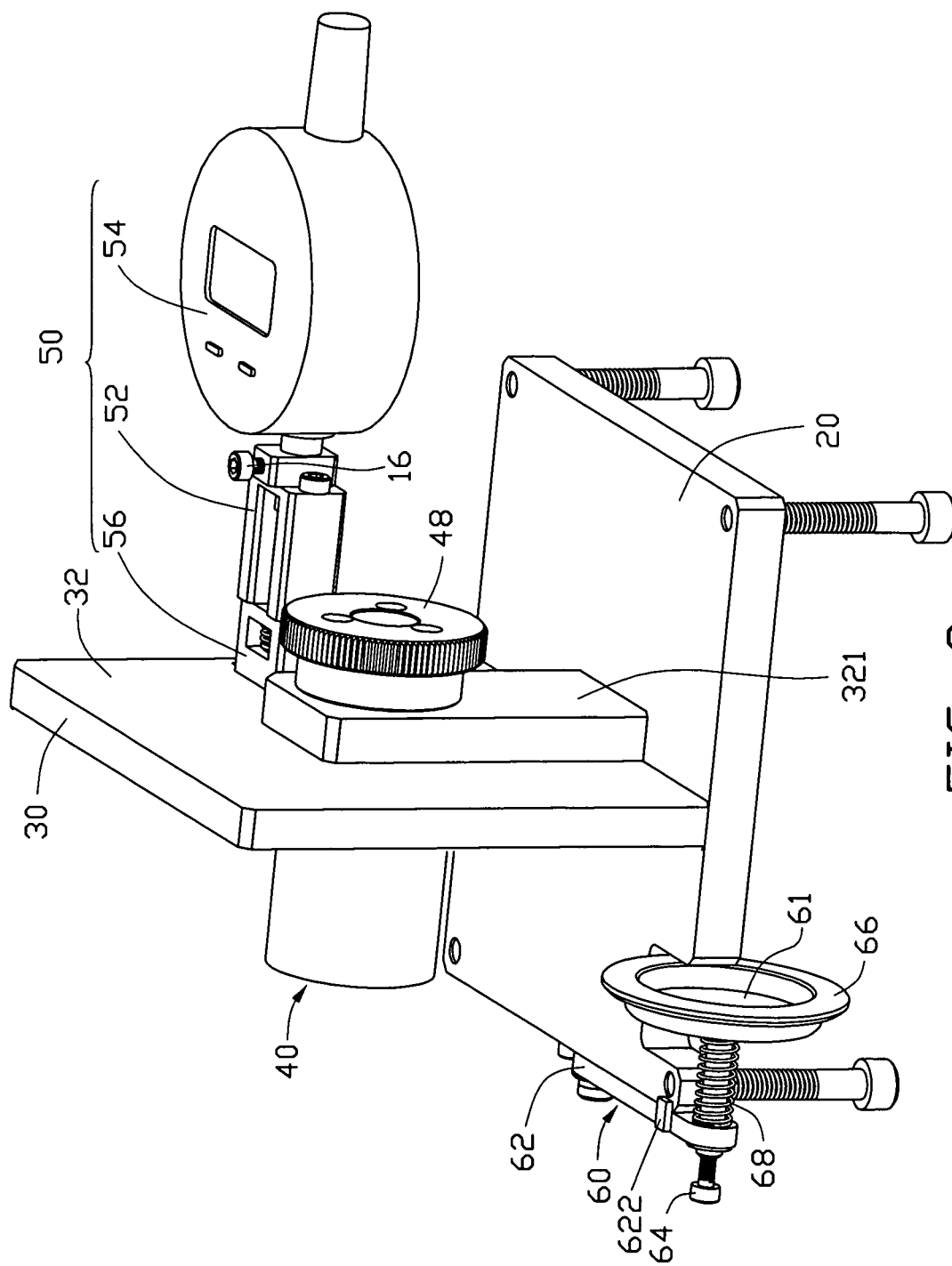
FIG. 2 is an assembled, isometric view of FIG. 1, but viewed from another aspect.
Figure 3:
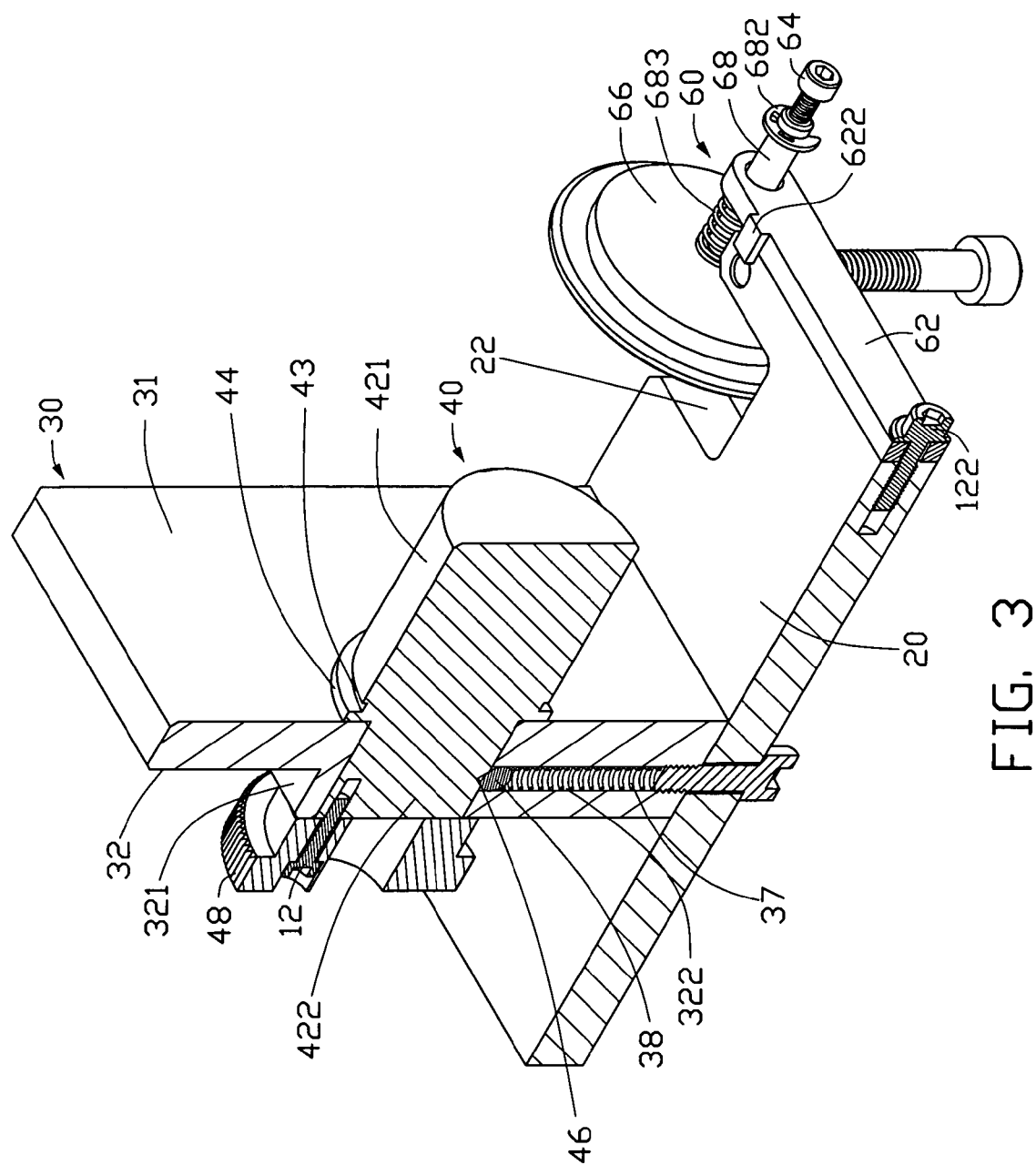
FIG. 3 is an assembled, cross-sectional view of FIG. 1.
Figure 4:
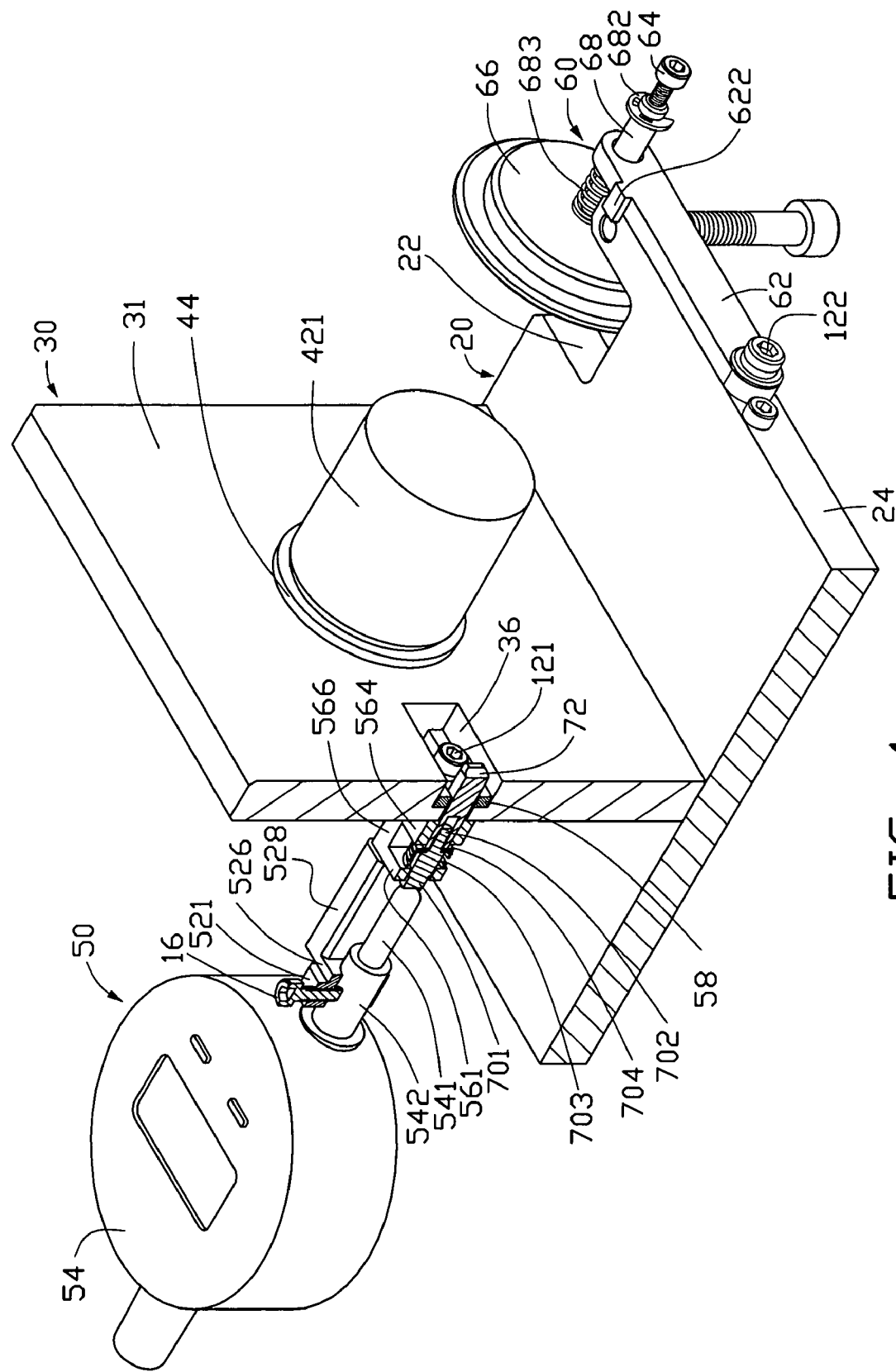
FIG. 4 is another assembled, cross-sectional view of FIG. 1.

Referring also to FIG. 2 to FIG. 4, in assembly, the support plate 30 is fastened to the base plate 20 by a plurality of screws extending through the through holes of the base plate 20 to engage in the fixing holes of the support plate 30. A resilient member, such as a spring 37 is fitted in the fixing hole 322 of the support plate 30, with one end thereof is propped on a distal end of the screw being engaging in the fixing hole 322. A steel positioning ball 38 is propped on the other end of the spring 37. The mounting portion 422 of the shaft 40 passes through the through hole 34 from the first side surface 31 of the support plate 30. The shoulder 44 of the shaft 40 contacts the first side surface 31 of the support plate 30. The slot 46 of the shaft 40 is engaged with the ball 38. The rotatable part 48 is mounted to a distal end of the main body 42 by three screws 12. Thus, the shaft 40 is rotatably mounted to the support plate 30. The pole 541 of the test meter 54 is extended through the through hole 523 of the frame 52. A screw 16 is extended through the screw hole 522 of the holding member 521 of the frame 52 to engage with the pole 541 of the test meter 54 via a distal end thereof. A resilient member, such as spring 703, and a gasket 704 is received in the through hole 561 of the support member 56, with their through holes aligning with the round hole 562 and the rectangular hole 567 respectively. The test block 72 is inserted into the rectangular hole 567 to contact the gasket 704. The peg 70 is extended through the round hole 562 of the support member 56, the spring 703, and the gasket 704 to engage in the screw hole of the test block 72. Two screws 121 are respectively extended through the through holes 582 of the mounting plate 58 to be engaged in the screw holes 563 of the support member. The mounting plate 58 is received in the slot 36 of the support plate 30. An opposite end of the test block 72 passes through the rectangular hole 581. Thus, the support member 56 and the mounting plate 58 are located at opposite sides of the support plate 30. Two screws 14 are respectively extended through the through holes 525 of the frame 52 to be engaged in the screw holes 563 of the support member 56, thus the frame 52 is mounted to the support member 56. A distal end of the pole 541 of the test meter 54 contacts a distal end of the column portion 701 of the peg 70. The swing arm 62 is fixed to a side 24 neighboring the cutout 22 of the base plate 20 by a screw 122 extending through the hole 621 to be engaged with the base plate 20. A resilient member, such as a spring 683 fits about the column 68. The round plate 66 and the spring 68 are located in the cutout 22 of the base plate 20. The column 68 is extended through the hole 620 of the swing arm 62 and a clip 682 to make its fixing hole engage with a screw 64. The clip 682 is engaged in the annular slot 681 of the column 68. The column 68 is slidably received in the hole 620 of the swing arm 62.

Figure 5:
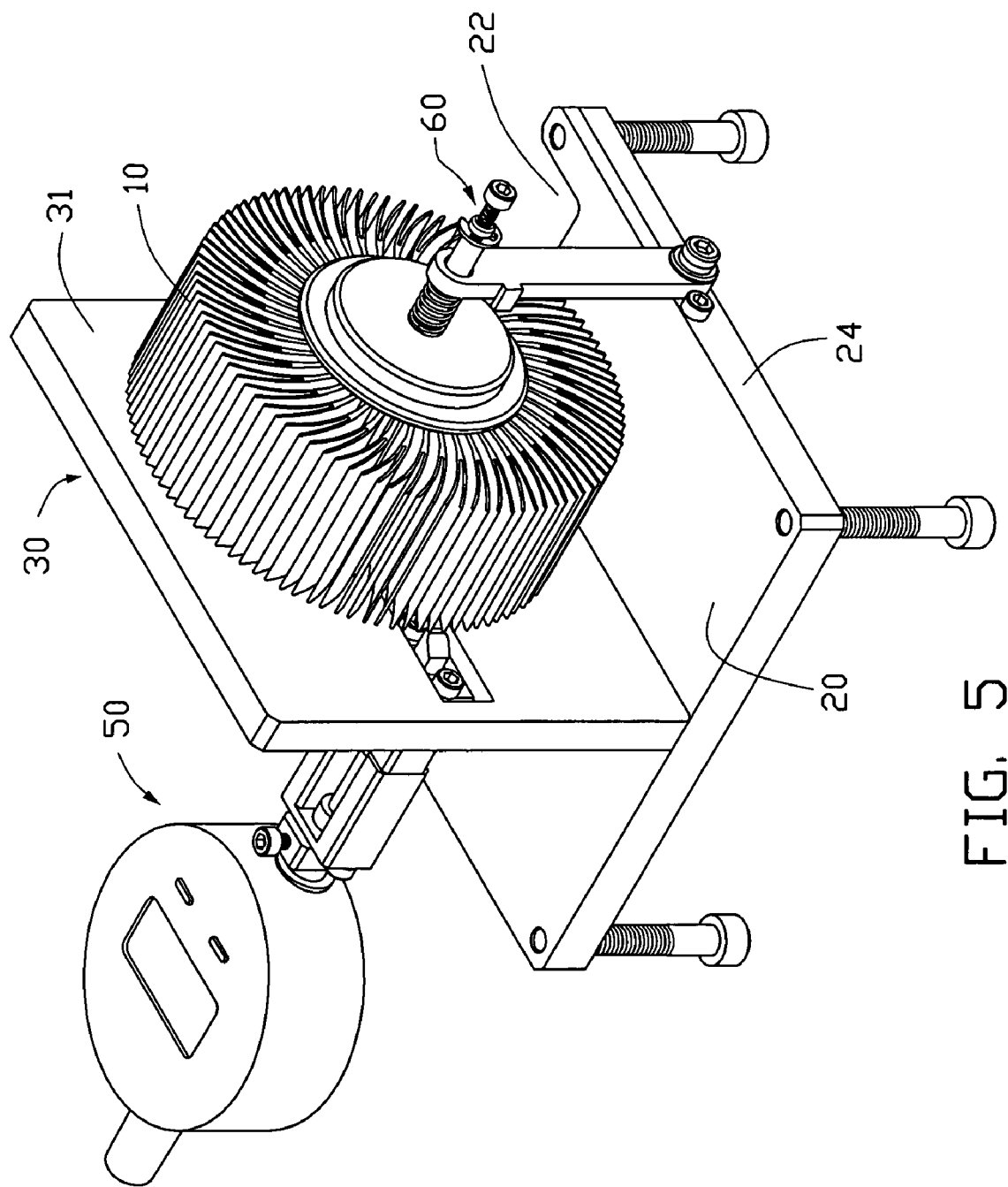
FIG. 5 is an assembled view of FIG. 1, together with a heat sink.

Referring also to FIG. 5, in use, the heat sink 10 is placed between the shaft 40 and the fastening member 60. The positioning portion 421 of the shaft 40 is inserted into the hole along an axial direction of the heat sink 10, with the shoulder 44 contacting a first side surface of the heat sink 10. The swing arm 62 is rotated up to make the round plate 66 contact a second side surface opposite to the first side surface of the heat sink 10. The positioning portion 41 of the shaft 40 is accommodated in the concavity 61 of the round plate 66. Because of the elasticity of the spring 683, the round plate 66 tightly contacts with the corresponding side surface of the heat sink 10. At this time, the end surface of the heat sink 10 contacts the test block 72. The rotatable part 48 is rotated for rotating the heat sink 10, and changes on radii of the heat sink 10 will drive the test block 72 to extend or retract, thus the pole 541 of the test meter 54 is extended or retracted with a value of the test meter 54 changes.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A test apparatus for testing planes of an end surface of a columniform workpiece, comprising:
    a base plate;
    a support plate perpendicularly mounted to a top surface of the base plate;
    a shaft rotatably mounted to the support plate, configured for mounting the columniform workpiece at a side of the support plate and making the columniform workpiece perpendicularly rotate relative to the support plate;
    a contact member mounted the support plate and perpendicularly slidable relative to the support plate, with a first end thereof contacting the end surface of the columniform workpiece; and
    a test meter having a pole with a distal end thereof contacting a second end opposite to the first end of the contact member, the pole capable of collapsing corresponding to the end surface of the columniform workpiece, and a value of the test meter capable of changing with lengths of the pole.

2. The test apparatus as claimed in claim 1, wherein the support plate defines a through hole therein, the shaft comprises a main body and a rotatable part, the main body comprises a positioning portion at an end thereof configured for being inserted into a hole that is perpendicular to the end surface of the columniform workpiece to mounting the columniform workpiece, and a mounting portion at an opposite end thereof, the mounting portion passes through the through hole of the support plate with a distal end thereof mounting the rotatable part for being operated to make the shaft rotatable.

3. The test apparatus as claimed in claim 2, further comprising a support member and a mounting plate, wherein the support plate defines a slot adjacent the through hole thereof, the support member and the mounting plate are fixed in the slot at opposite sides of the support plate, the contact member is slidably mounted to the support member and the mounting plate, with the first and second ends thereof respectively extending through the mounting member and the support member.

4. The test apparatus as claimed in claim 3, wherein the contact member comprises a peg and a test block mounted to an end of the peg, the support member defines a through hole therein from a top surface to a bottom surface thereof, and a hole perpendicular to and communicating with the through hole, the peg is extended in the hole of the support member, a resilient member fitting about the peg is accommodated in the through hole, an end opposite to the peg of the test block acts as the first end of the contact member, and an end opposite to the test block of the peg acts as the second end of the contact member.

5. The test apparatus as claimed in claim 4, further comprising a U-shaped frame mounted to the support member, the test meter is mounted to the frame, and the pole of the test meter extends through the frame to contact the second end of the contact member.

6. The test apparatus as claimed in claim 5, wherein the test meter further comprises an annual portion extending therefrom ringing the pole, the frame comprises a vertical plate and two side plates perpendicularly extending from opposite sides of the vertical plate, a holding member is mounted to a lateral surface opposite to the side plates, of the vertical plate, a through hole for the pole and the annual portion of the test meter extending therethrough is defined in the holding member and extends through the vertical plate and the holding member, a screw hole perpendicular to and communicating with the through hole of the test meter is defined in the holding member, for a screw extending therethrough to engage with the annual portion.

7. The test apparatus as claimed in claim 1, further comprising a fastening system rotatably mounted to a side of the base plate, wherein the fastening system and the shaft sandwiching the columniform workpiece therebetween.

8. The test apparatus as claimed in claim 7, wherein the fastening system comprises an swing arm with an end rotatably mounted to the base plate, a plate moveably mounted to an opposite end of the swing arm.

9. The test apparatus as claimed in claim 8, wherein a column extends from the plate, the opposite end of the swing arm defines a hole therein, the column of the plate extends through the hole of the swing arm, a resilient member fits about the column of the plate and is resiliently located between the plate and the swing arm.

10. The test apparatus as claimed in claim 8, wherein the swing arm comprises a protruding portion to prevent the swing arm lower than the base plate.

11. The test apparatus as claimed in claim 8, wherein the plate defines a concave in a side surface opposite to the column, to accommodate a distal end of the positioning portion of the shaft that extends through the hole of the columniform workpiece.

* * * * *